US007787557B2

(12) United States Patent
Kim et al.

(10) Patent No.: US 7,787,557 B2
(45) Date of Patent: Aug. 31, 2010

(54) APPARATUS FOR EQUALIZING CLIPPING NOISE SIGNALS OF RECEIVER SYSTEMS AND METHOD THEREOF

(75) Inventors: Young-Doo Kim, Yongin-si (KR); Eung Sun Kim, Yongin-si (KR); Gi Hong Lim, Pohang-si (KR); Ui Kun Kwon, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 812 days.

(21) Appl. No.: 11/711,119

(22) Filed: Feb. 27, 2007

(65) Prior Publication Data

US 2008/0089224 A1 Apr. 17, 2008

(30) Foreign Application Priority Data

Oct. 16, 2006 (KR) ............... 10-2006-0100263

(51) Int. Cl.
*H04B 15/00* (2006.01)
(52) U.S. Cl. ............ 375/285; 375/346; 375/350; 375/260; 455/501; 455/63.1; 455/570; 455/114.2; 455/296
(58) Field of Classification Search ........... 375/260, 375/296, 316, 222, 219, 229, 285, 346, 350; 370/210; 455/501, 63.1, 570, 114.2, 296
See application file for complete search history.

(56) References Cited

U.S. PATENT DOCUMENTS

| 6,389,062 | B1 * | 5/2002 | Wu ........................... 375/222 |
| 6,549,512 | B2 * | 4/2003 | Wu et al. ..................... 370/210 |
| 7,085,315 | B1 * | 8/2006 | Kelton ........................ 375/219 |
| 7,283,598 | B2 * | 10/2007 | Akita et al. ................... 375/316 |
| 2004/0052314 | A1 * | 3/2004 | Copeland ..................... 375/296 |

(Continued)

FOREIGN PATENT DOCUMENTS

JP 2003-218826 A 7/2003

(Continued)

OTHER PUBLICATIONS

Hangjun Chen, et al., "Iterative Estimation and Cancellation of Clipping Noise for OFDM Signals," IEEE Communications Letters, vol. 7, No. 7, Jul. 2003.

(Continued)

*Primary Examiner*—Phuong Phu
(74) *Attorney, Agent, or Firm*—Sughrue Mion, PLLC

(57) ABSTRACT

An apparatus for correcting clipping distortion of a receiver system includes: an equalizer which generates a first equalization signal by equalizing a frequency domain clipping signal via a first equalization coefficient correcting a channel distortion, and generates a second equalization signal by equalizing the frequency domain clipping signal via a second equalization coefficient correcting the clipping distortion and the channel distortion; and a signal reconstruction unit which receives the first equalization signal and the second equalization signal from the equalizer, determines a transmission symbol by performing a hard decision with respect to the second equalization, and reconstructs a signal by using an amplitude of the transmission symbol and a phase of the first equalization signal when a level of the amplitude of the transmission symbol is greater than or equal to a reference value.

19 Claims, 5 Drawing Sheets

U.S. PATENT DOCUMENTS

2004/0131124 A1* 7/2004 Arambepola et al. ........ 375/260
2005/0185723 A1 8/2005 Anvari

FOREIGN PATENT DOCUMENTS

| JP | 2004-221702 A | 8/2004 |
| KR | 10-2001-0069611 A | 7/2001 |
| KR | 10-2005-0108219 A | 11/2005 |

OTHER PUBLICATIONS

Dukhyun Kim, et al., "Clipping Noise Mitigation for OFDM by Decision-Aided Reconstruction," IEEE Communications Letters, vol. 3, No. 1, Jan. 1999.

Bingyang Wu, et al., "Interative Channel Estimation and Signal Detection in Clipped OFDM," pp. 2265-2269, 2005 IEEE.

* cited by examiner

APPARATUS FOR EQUALIZING CLIPPING NOISE SIGNALS OF RECEIVER SYSTEMS AND METHOD THEREOF

CROSS-REFERENCE TO RELATED APPLICATION

This application claims priority from Korean Patent Application No. 10-2006-0100263, filed on Oct. 16, 2006, in the Korean Intellectual Property Office, the entire disclosure of which is incorporated herein by reference.

BACKGROUND OF THE INVENTION

1. Field of the Invention

Methods and apparatuses consistent with the present invention relate to a method and apparatus for correcting clipping distortion of a receiver system, and more particularly, to a method and apparatus for correcting a signal distortion caused by clipping, which occurs when clipping is performed to reduce a peak-to-average ratio (PAPR) in a wideband wireless communication system including an Orthogonal Frequency Division Multiplexing (OFDM) scheme.

2. Description of Related Art

Multi-carrier transmission schemes, such as an Orthogonal Frequency Division Multiplexing (OFDM) scheme, a Filtered Multitone (FMT) scheme, and the like, are robust against adverse channel environments, such as frequency-selective fading, narrowband interference, and the like. However, since these multi-carrier transmission schemes have a comparatively high peak-to-average ratio (PAPR), a power efficiency of a transmission amplifier may be reduced, and non-linear distortion of a transmission signal may occur.

Among PAPR reduction methods, clipping method cuts a portion corresponding to an area where a level of an input signal is greater than or equal to a reference value, i.e. clipping amplitude. In this instance, the clipping method may be simply and readily configured. However, the clipping method may cause a distortion of a transmission signal and thereby degrade a Bit Error Rate (BER). Therefore, a method and apparatus for correcting signal distortion caused by clipping, which occurs when the clipping is performed to reduce a peak-to-average ratio (PAPR) in a wideband wireless communication system including an Orthogonal Frequency Division Multiplexing (OFDM) scheme, is needed.

SUMMARY OF THE INVENTION

Aspects of the present invention provide a method and apparatus for correcting clipping distortion of a receiver system, which can estimate an initial estimation value of a signal to have a comparatively high reliability, restore the signal, and improve a BER of a system by performing equalization using two equalization coefficients to acquire an estimation value of a clipped signal and an estimation value of a pre-clipped signal, and also can reduce system complexity by reducing a number of signal restorations.

Aspects of the present invention also provide a method and apparatus for correcting clipping distortion of a receiver system, which can reduce a decision error propagation that may occur when restoring a clipped signal.

Aspects of the present invention also provide a method and apparatus for correcting clipping distortion of a receiver system, which can utilize an optimal equalizer for each of a clipped signal and a non-clipped signal of a transmission signal, which is required during a decision-aided reconstruction (DAR) and an iterative amplitude restructure (IAR) signal restoration process, and thereby can restore a signal by considering both an additive white Gaussian noise (AWGN) and clipping noise.

According to an aspect of the present invention, there is an apparatus for correcting clipping distortion of a receiver system, the apparatus including: an equalizer which generates a first equalization signal by equalizing a frequency domain clipping signal via a first equalization coefficient correcting a channel distortion, and generates a second equalization signal by equalizing the frequency domain clipping signal via a second equalization coefficient correcting the clipping distortion and the channel distortion; and a signal reconstruction unit which receives the first equalization signal and the second equalization signal from the equalizer, determines a transmission symbol by performing a hard decision with respect to the second equalization, and reconstructs a signal by using an amplitude of the transmission symbol and a phase of the first equalization signal when a level of the amplitude of the transmission symbol is greater than or equal to a reference value.

Also, according to another aspect of the present invention, there is provided a method of correcting clipping distortion, the method including: receiving a frequency domain clipping signal; generating a first equalization signal by equalizing the frequency domain clipping signal via a first equalization coefficient correcting a channel distortion, and generating a second equalization signal by equalizing the frequency domain clipping signal via a second equalization coefficient correcting the clipping distortion and the channel distortion; determining a transmission symbol by performing a hard decision with respect to the second equalization signal; comparing a level of an amplitude of the transmission symbol with a reference value; and reconstructing a signal by using the amplitude of the transmission symbol and a phase of the first equalization signal when the level of the amplitude of the transmission symbol is greater than or equal to a reference value.

Also, according to another aspect of the present invention, there is provided a computer-readable recording medium storing executable instructions implementing a method of correcting clipping distortion, the method comprising: receiving a frequency domain clipping signal; generating a first equalization signal by equalizing the frequency domain clipping signal via a first equalization coefficient correcting a channel distortion, and generating a second equalization signal by equalizing the frequency domain clipping signal via a second equalization coefficient correcting the clipping distortion and the channel distortion; determining a transmission symbol by performing a hard decision with respect to the second equalization signal; comparing a level of an amplitude of the transmission symbol with a reference value; and reconstructing a signal by using the amplitude of the transmission symbol and a phase of the first equalization signal when the level of the amplitude of the transmission symbol is greater than or equal to a reference value.

BRIEF DESCRIPTION OF THE DRAWINGS

The above and other aspects and advantages of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
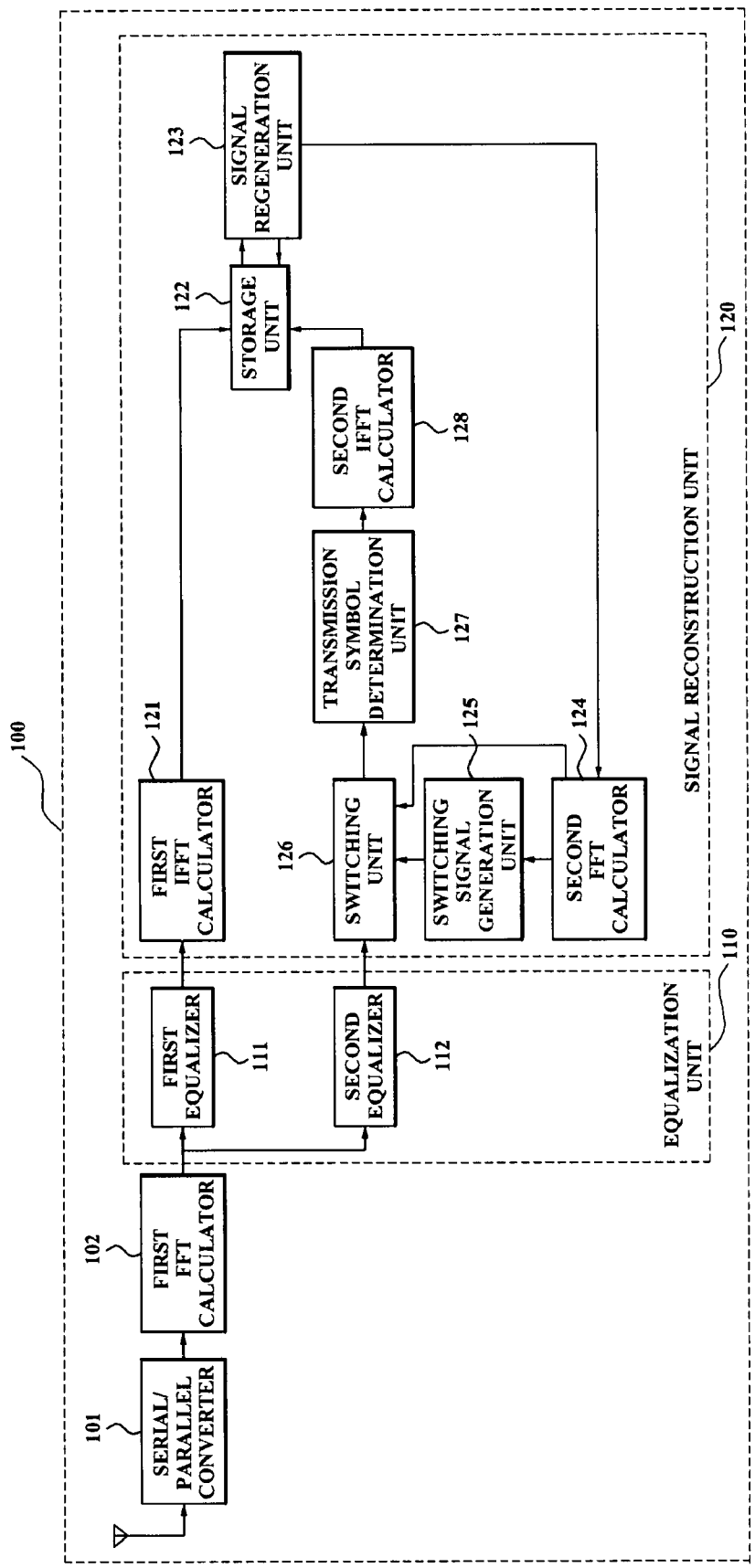
FIG. 1 is a block diagram illustrating an apparatus for correcting clipping distortion of a receiver system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 is a block diagram illustrating an apparatus for correcting clipping distortion of a receiver system according to an exemplary embodiment of the present invention.

The clipping distortion correcting apparatus 100 of a receiver system may include an equalization unit 110 and a signal reconstruction unit 120. Also, the clipping distortion correcting apparatus 100 may include a serial/parallel converter 101 and a first fast Fourier transform (FFT) calculator 102 for pre-processing units to correct clipping distortion.

The serial/parallel converter 101 converts a time domain serial signal, which is received via an antenna, into a time domain parallel signal, and outputs the converted time domain parallel signal to the first FFT calculator 102.

The first FFT calculator 102 receives the converted time domain parallel signal from the serial/parallel converter 101, performs an FFT to transform the received time domain parallel signal into a frequency domain signal, and outputs the transformed frequency domain signal to the equalization unit 110.

The equalization unit 110 receives the frequency domain signal from the first FFT calculator 102, equalizes the received frequency domain signal, and outputs the equalized frequency domain signal to the signal reconstruction unit 120. In this instance, the equalization unit 110 includes a first equalizer 111 and a second equalizer 112.

The first equalizer 111 of the equalization unit 110 receives the frequency domain signal from the first FFT calculator 102, corrects a channel distortion with respect to the received frequency domain signal, and outputs the corrected frequency domain signal, as a first equalization signal, to the signal reconstruction unit 120.

The second equalizer 112 receives the frequency domain signal from the first FFT calculator 102, corrects the channel distortion and clipping distortion with respect to the received frequency domain signal, and outputs the corrected frequency domain signal, as a second equalization signal, to the signal reconstruction unit 120.

The signal reconstruction unit 120 receives the first equalization signal and the second equalization signal from the equalization unit 110, and determines a transmission symbol by performing a hard decision with respect to the second equalization signal. Also, the signal reconstruction unit 120 transforms the frequency domain signal into a time domain signal with respect to each of the transmission symbol and the first equalization signal, and stores the transformed time domain signals, and then regenerates a signal by using an amplitude and a phase of the time domain signal of the first equalization signal and an amplitude of the time domain signal of the transmission symbol. In this instance, the signal reconstruction unit 120 may include a first inverse fast Fourier transform (IFFT) calculator 121, a storage unit 122, a signal regeneration unit 123, a second FFT calculator 124, a switching signal generation unit 125, a switching unit 126, a transmission symbol determination unit 127, and a second IFFT calculator 128.

The first IFFT calculator 121 transforms a frequency domain signal into a time domain signal with respect to the first equalization signal input from the first equalizer 111, and outputs the transformed time domain signal to the storage unit 122.

The switching unit 126 receives the second equalization signal from the second equalizer 112, receives a feedback signal from the second FFT calculator 124, selects either one of the second equalization signal and the feedback signal according to a switching signal input from the switching signal generation unit 125, which will be described later, and outputs the selected signal to the transmission symbol determination unit 127.

The switching signal generation unit 125 generates a switching signal which provides a different switching path according to a number of feedback signals being generated by the second FFT calculator 124. The transmission symbol determination unit 127 determines the transmission symbol by performing the hard decision with respect to the second equalization signal or the feedback signal input from the switching unit 126, and outputs the determined transmission symbol to the second IFFT calculator 128.

The second IFFT calculator 128 transforms a frequency domain signal into a time domain signal with respect to the transmission symbol input from the transmission symbol determination unit 127, and outputs the transformed time domain signal.

The storage unit 122 stores the time domain signals which are input from the first IFFT calculator 121 and the second IFFT calculator 128, and outputs the stored time domain signals to the signal regeneration unit 123 according to a control (under control of??) of the signal regeneration unit 123.

The signal regeneration unit 123 regenerates a signal by using a phase of the time domain signal of the first equalization signal, and the amplitude of the time domain signal of the transmission symbol or the amplitude of the time domain signal of the first equalization signal.

The second FFT calculator 124 generates a feedback signal by receiving the regenerated signal from the signal regeneration unit 123 and transforming the time domain signal into another frequency domain signal with respect to the regenerated signal, and outputs the generated feedback signal to the switching unit 126.

The clipping distortion correcting apparatus according to an embodiment of the present invention, as described above, restores a signal by correcting a channel distortion and a clipping distortion of a received clipping signal. Hereinafter, a clipping amplitude and a clipping process before receiving a clipping signal will be described in detail.

A baseband transmission signal of an Orthogonal Frequency Division Multiplexing (OFDM) scheme, which has an N number of subchannels, is expressed as $$x(t) = \frac{1}{\sqrt{N}} \sum_{n=0}^{N-1} X_{i,n} \exp(j2\pi n f_0 t), \quad \text{[Equation 1]}$$
$$0 \le t \le T.$$

Here, x(t) designates an OFDM baseband transmission signal, $f_o$ designates a frequency interval between subcarriers, T designates a symbol period, N designates a total number of subchannels, and $X_{i,n}$ designates an $i^{th}$ OFDM transmission symbol sequence, which is mapped with a quadrature amplitude modulation (QAM) scheme.

A discrete time domain transmission signal $X_{i,k}$ may be acquired by performing N-point IFFTs with respect to the transmission symbol $X_{i,n}$. A clipping process with respect to an IFFT output signal is given by $$\overline{x}_{i,k} = \begin{cases} x_{i,k}, & |x_{i,k}| \le A, \\ A \exp\{\arg(x_{i,k})\}, & |x_{i,k}| > A, \end{cases} \quad 0 \le k \le N-1 \quad \text{[Equation 2]}$$

Here, $\overline{x}_{i,k}$ designates an OFDM sample of a clipped signal, and A designates clipping amplitude.

The clipping ratio is defined by $$CR = 20\log\frac{A}{\sigma}\text{dB}. \quad \text{[Equation 3]}$$

Here, CR designates the clipping ratio, A designates the clipping amplitude, and $\sigma^2$ designates an input power of $x_{i,k}$ which corresponds to a pre-clipped signal.

When a large number of subchannels is provided due to a central limit theorem (CLT), the amplitude of $X_{i,k}$ may be assumed to be defined by Rayleigh scattering.

Therefore, an output power of clipped signal $\overline{x}_{i,k}$ is calculated by $$P_{out} = (1 - e^{-\gamma})P_{in}. \quad \text{[Equation 4]}$$

Here, $P_{out}$ designates the output signal of the clipped signal, and $\gamma$ designates a ratio of the pre-clipped signal $x_{i,k}$ to the clipping amplitude A.

Also, $P_{in}$ designates an input power of the pre-clipped signal $x_{i,k}$, and is given by $$P_{in} = \sigma^2 \quad \text{[Equation 5]}$$

In this instance, $P_{in}$ designates the input power of the pre-clipped signal $x_{i,k}$, and $\sigma$ designates an input amplitude of the pre-clipped signal $x_{i,k}$.

Also, the clipping ratio corresponds to a ratio of the input amplitude of the pre-clipped signal $x_{i,k}$ to the clipping amplitude A, and is given by $$\gamma = A/\sigma \quad \text{[Equation 6]}$$

Here, A designates the clipping amplitude, and $\sigma$ designates the input amplitude of the pre-clipped signal $x_{i,k}$.

Hereinafter, an operation of an apparatus for correcting clipping distortion according to the present invention will be described with reference to FIG. 1 again.

The serial/parallel converter 101 converts a received clipping signal from a serial signal into a parallel signal, and outputs the converted parallel signal to the first FFT calculator 102. The first FFT calculator 102 performs an FFT to transform a time domain signal into a frequency domain received signal $R_{i,n}$ with respect to a non-discrete parallel signal $X_{i,k}$. The first equalizer 111 generates a first equalization signal by correcting a channel distortion of the frequency domain received signal $R_{i,n}$ as follows $$\hat{X}_{i,n} = \frac{H_n^*}{|H_n|^2 + N_0} R_{i,n} = W_n R_{i,n}, \quad \text{[Equation 7]}$$
$$0 \le n \le N-1.$$

Herein, $H_n$ designates a channel frequency response, $W_n$ designates a first equalization coefficient to compensate for a multipath channel, and $N_o$ designates noise power.

The first IFFT calculator 121 performs a first IFFT to transform a frequency domain signal into a time domain signal with respect to a first equalization signal $\hat{X}_{i,n}$, and outputs the transformed time domain signal to the storage unit 122. The storage unit 122 stores a time domain signal $\overline{x}_{i,k}$ which is an estimation value of a clipped sample.

Hereinafter, a process of calculating a second equalization signal corresponding to an optimal equalization coefficient to acquire a very reliable initial estimation value with respect to a pre-clipped transmission signal of an OFDM scheme will be described.

$\overline{x}_{i,k}$ corresponding to a clipped OFDM sample may be given by an addition of clipping noise $d_{i,k}$ and a reduction component of a signal $\alpha x_{i,k}$ as follows $$\overline{x}_{i,k} = \alpha x_{i,k} + d_{i,k}, \ 0 \le k \le N-1. \quad \text{[Equation 8]}$$

Here, $\alpha$ designates the reduction component and corresponds to a function of $\gamma$, and may be represented as $$\alpha = \frac{E[x_{i,k}\overline{x}_{i,k}]}{E[x_{i,k}x_{i,k}]} = 1 - e^{-\gamma^1} + \frac{\sqrt{\pi}}{2}\text{erfc}(\gamma) \quad \text{[Equation 9]}$$

When a large number of subchannels is provided, the pre-clipped signal $x_{i,k}$ may be assumed to be a complex Gaussian probability variable which has an identically independent distribution.

Therefore, $D_{i,n}$ corresponding to clipping noise component of an $n^{th}$ subchannel is given by $$D_{i,x} = \frac{1}{\sqrt{N}} \sum_{k=0}^{N-1} d_{i,k} e^{-j2\pi(n/N)k}, \ 0 \le n \le N-1. \quad \text{[Equation 10]}$$

Here, $d_{i,k}$ designates a probability variable of the identically independent distribution with the mean of 0. Therefore, when a great number of subchannels is provided, $D_{i,n}$ is converged to the complex Gaussian probability variable with the mean of 0 by the CLT.

Also, the frequency domain received signal $R_{i,n}$ of the OFDM scheme may be represented as $$R_{i,n} = H_n \overline{X}_{i,n} + Z_{i,n} \quad \text{[Equation 11]}$$
$$= H_n(\alpha X_{i,n} + D_{i,n}) + Z_{i,n}$$
$$= \alpha H_n X_{i,n} + Q_{i,n},$$

Here, $H_n$ designates a channel frequency response, $Z_{i,n}$ designates a frequency domain clipping noise, and $Q_{i,n}$ designates an addition of $H_n D_{i,n}$ and $Z_{i,n}$. Therefore, the second equalization coefficient, which is a minimum mean square error equalization coefficient to acquire the initial estimation value of the transmission signal, is acquired by $$C_n = \frac{(\alpha H_n)^*}{|\alpha H_n|^2 + E[Q_{i,n}^2]}, \quad \text{[Equation 12]}$$
$$0 \leq n \leq N-1.$$

Here, the frequency domain clipping noise $D_{i,n}$ is independent from $Z_{i,n}$, and a power of the frequency domain clipping noise $D_{i,n}$ is given by $$E[D_{i,n}^2] = P_{out} - \alpha^2 P_{in} \quad \text{[Equation 13]}$$

Therefore, the second equation coefficient may be arranged to be $$C_n = \frac{\alpha H_n^*}{\alpha^2 |H_n|^2 + E[H_n^2 D_{i,n}^2] + E[Z_{i,n}^2]} \quad \text{[Equation 14]}$$
$$= \frac{\alpha H_n^*}{(1 - e^{-r^1})|H_n|^2 + N_0},$$

Also, the second equalizer 112 generates the second equalization signal by correcting the channel distortion and the clipping distortion of the frequency domain received signal $R_{i,n}$ using a second equalization coefficient $C_n$.

The transmission symbol determination unit 127 determines the transmission symbol by performing the hard decision with respect to the second equalization signal, and outputs the determined transmission symbol to the second IFFT calculator 128. Here, the transmission symbol determined by the transmission symbol determination unit 127 is given by $$\hat{X}_{i,n}^{(I)} = \min_{\{X\}} |C_n R_{i,n} - X|, 0 \leq N \leq N-1. \quad \text{[Equation 15]}$$

Here, $C_n$ designates the second equalization coefficient, $R_{i,n}$ designates the received signal, X designates a QAM mapping symbol, $\hat{X}_{i,n}^{(I)}$ designates a hard decided transmission symbol, and I designates a number of feedback signals being generated. In this instance, the number starts from 0.

The second IFFT calculator 128 performs a second IFFT to transform the frequency domain signal into a time domain signal with respect to the transmission symbol, and outputs the transformed time domain signal to the storage unit 122. The storage unit 122 stores a time domain signal $\hat{x}_{i,k}$ corresponding to an estimation value of a pre-clipped sample.

The signal regeneration unit 123 retrieves clipped samples by comparing an amplitude of $\hat{x}_{i,k}$, which is stored in the storage unit 122, with the clipping amplitude A, and generates a regenerated signal $\{y_{i,k}^{(I)}\}_{k=0}^{N-1}$ where the amplitude is restored.

$$y_{i,k}^{(I)} = \begin{cases} \hat{x}_{i,k}, & |\hat{x}_{i,k}^{(I)}| \leq A \\ |\hat{x}_{i,k}^{(I)}| \exp\{\arg(\hat{x}_{i,k})\}, & |\hat{x}_{i,k}^{(I)}| > A, \end{cases} \quad 0 \leq k \leq N-1. \quad \text{[Equation 16]}$$

Here, A designates the clipping amplitude and $\{y_{i,k}^{(I)}\}_{k=0}^{N-1}$ designates the regenerated signal.

The second FFT calculator 124 acquires an estimation value of the transmission signal by transforming a time domain signal into a frequency domain signal $\{Y_{i,n}^{(I)}\}_{n=0}^{N-1}$ with respect to the regenerated signal $\{y_{i,k}^{(I)}\}_{k=0}^{N-1}$, and the estimation value is given by $$\hat{X}_{i,n}^{(I+1)} = \min_{\{x\}} |Y_{i,n}^{(I)} - X|, 0 \leq n \leq N-1. \quad \text{[Equation 17]}$$

Here, $\{Y_{i,n}^{(I)}\}_{n=0}^{N-1}$ corresponds to a feedback signal which is acquired by performing a second FFT with respect to $\{y_{i,k}^{(I)}\}_{k=0}^{N-1}$, and $\hat{X}_{i,n}^{(I+1)}$ designates a hard decided transmission symbol.

An $I^{th}$ feedback is terminated in Equation 17, and in this instance, an I+1 number of feedback signals may be required to additionally perform the above-described operation.

When performing the I+1$^{th}$ feedback, the signal regeneration unit 123 outputs the regenerated signal to the second FFT calculator 124.

Also, the second FFT calculator 124 transforms the time domain signal into the frequency domain signal with respect to the regenerated signal, and outputs the transformed frequency domain signal to the switching signal generation unit 125.

The switching signal generation unit 125 generates a switching signal which provides a different switching path according to a number of feedbacks input from the second FFT calculator 124, and outputs the generated switching signal to the switching unit 126.

When a feedback index corresponding to the number of feedbacks is 0, the switching unit 126 selects the second equalization signal. Also, when the feedback index is greater than or equal to 1, the switching unit 126 selects the regenerated signal by the regeneration unit 123.

The transmission symbol determination unit 127 determines the transmission symbol by performing the hard decision with respect to the signal input from the switching unit 126.

Subsequent feedback operations will be the same as described above, and thus further detailed descriptions related thereto will be omitted.

Figure 2:
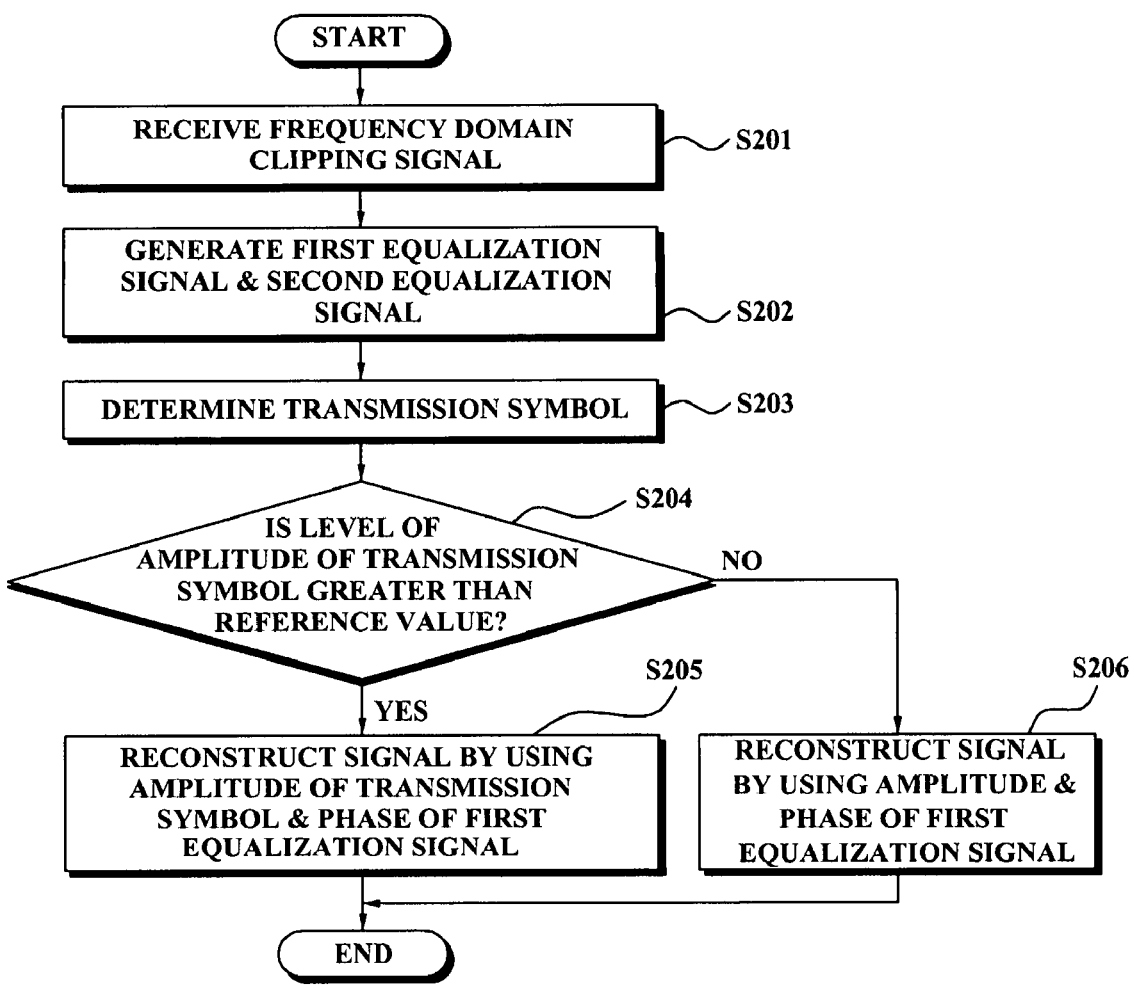
FIG. 2 is a flowchart illustrating a method of correcting clipping distortion of a receiver system according to an exemplary embodiment of the present invention.

FIG. 2 is a flowchart illustrating a method of correcting clipping distortion of the receiver system 100 according to an exemplary embodiment of the present invention.

In operation S201, a frequency domain clipping signal is received.

In operation S202, a first equalization signal is generated by equalizing the frequency domain clipping signal via a first equalization coefficient correcting channel distortion, and a second equalization signal is generated by equalizing the frequency domain clipping signal via a second equalization coefficient correcting clipping distortion and the channel distortion.

In this instance, the first equalization coefficient is represented as $$W_n = \frac{H_n^*}{|H_n|^2 + N_0} \quad \text{[Equation 18]}$$

Here, $H_n$ designates a channel frequency response, $N_o$ designates noise power, and $W_n$ designates a first equalization coefficient to compensate for a multipath channel.

It is desirable that the equalization unit 110 of the clipping distortion correcting apparatus 100 of the receiver system according to an embodiment of the present invention determines a second equalization coefficient according to a clipping ratio which corresponds to a ratio of an amplitude of a pre-clipped signal to an amplitude of the received frequency domain clipping signal. The second equalization coefficient is represented as $$C_n = \frac{\alpha H_n^*}{(1 - e^{-\gamma^2})|H_n|^2 + N_0} \quad \text{[Equation 19]}$$

Here, $H_n$ designates a channel frequency response, $\gamma$ designate the clipping ratio which corresponds to a ratio of a pre-clipping amplitude to a clipping amplitude, $\alpha$ designates a reduction component of a signal, i.e. a function of $\gamma$ which corresponds to the ratio of the pre-clipping amplitude to the clipping amplitude, $N_o$ designates a noise power, and $C_n$ designates the second equalization coefficient.

In operation S203, a transmission symbol is determined by performing a hard decision with respect to the second equalization signal.

In operation S204, a level of an amplitude of the transmission symbol is compared with a reference value. Here, the reference value corresponds to the clipping amplitude. Also, the clipping amplitude indicates a reference value when clipping an input signal by a clipping method. When clipping the input signal, a portion in which an area where a level of the input signal is greater than or equal to the reference value is clipped. In operation S205, when the level of the amplitude of the transmission symbol is greater than or equal to the reference value, a signal is reconstructed by using the amplitude of the transmission symbol and a phase of the first equalization signal.

Conversely, in operation S206, when the level of the amplitude of the transmission symbol is less than the reference value, the signal is reconstructed according to the phase and the amplitude of the first equalization signal.

Figure 3:
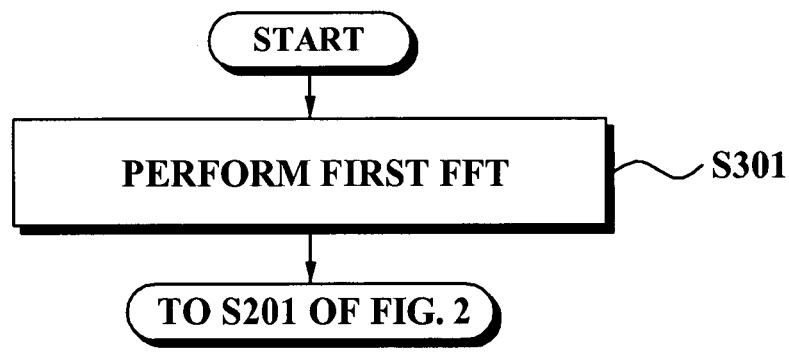
FIG. 3 is a flowchart illustrating a pre-processing process employed by a method of correcting clipping distortion of a receiver system according to an exemplary embodiment of the present invention.

FIG. 3 is a flowchart illustrating a pre-processing process employed by a method of correcting clipping distortion of a receiver system according to an exemplary embodiment of the present invention.

In operation S301, a time domain serial signal, which is received via an antenna, is converted into a time domain parallel signal, and a first FFT is performed to transform the received time domain signal into a frequency domain signal. After operation S301, operation S201 of FIG. 2 is re-performed.

Figure 4:
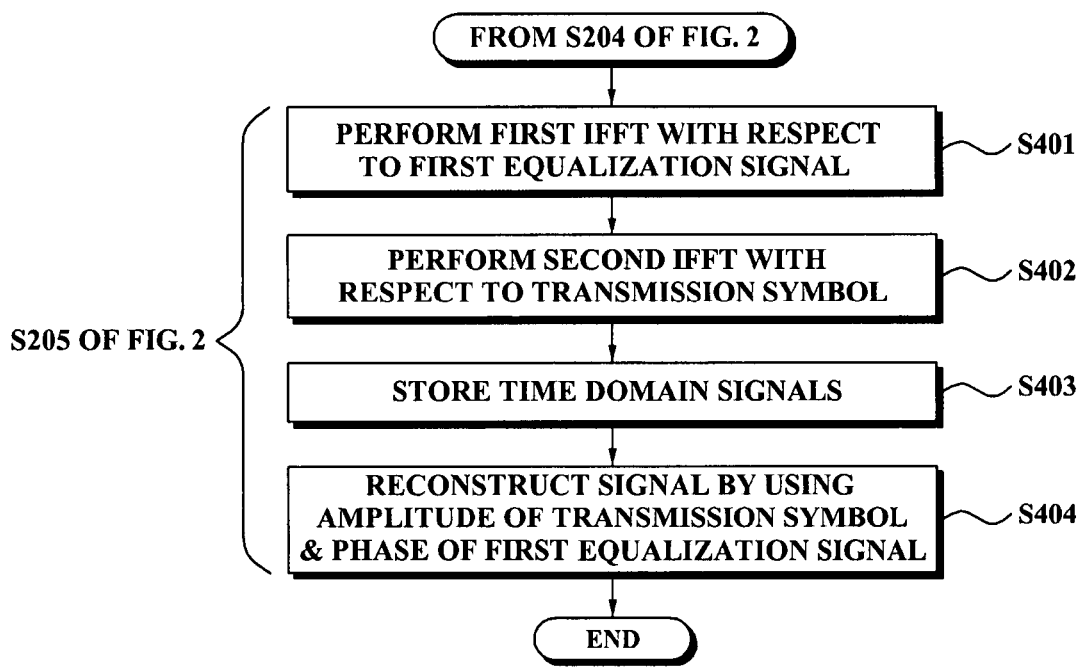
FIG. 4 is a flowchart illustrating a method of correcting clipping distortion of a receiver system which is performed in a signal reconstruction unit according to an exemplary embodiment of the present invention.

FIG. 4 is a flowchart illustrating a method of correcting clipping distortion of a receiver system which is performed in the signal reconstruction unit 120 according to an exemplary embodiment of the present invention. Specifically, FIG. 4 illustrates an example of operation S205 of reconstructing the signal when the level of the amplitude of the transmission symbol illustrated in FIG. 2 is greater than or equal to the reference value.

In operation S401, a first IFFT is performed to transform a frequency domain signal into a time domain signal with respect to a first equalization signal.

In operation S402, a second IFFT is performed to transform the frequency domain signal into the time domain signal with respect to a transmission symbol.

In operation S403, the time domain signals, which are transformed in the first IFFT and the second IFFT, are stored in the storage unit 122 of FIG. 1.

In operation S404, a signal is regenerated by using a phase of the time domain signal of the first equalization signal and the amplitude of the time domain signal of the transmission symbol.

Figure 5:
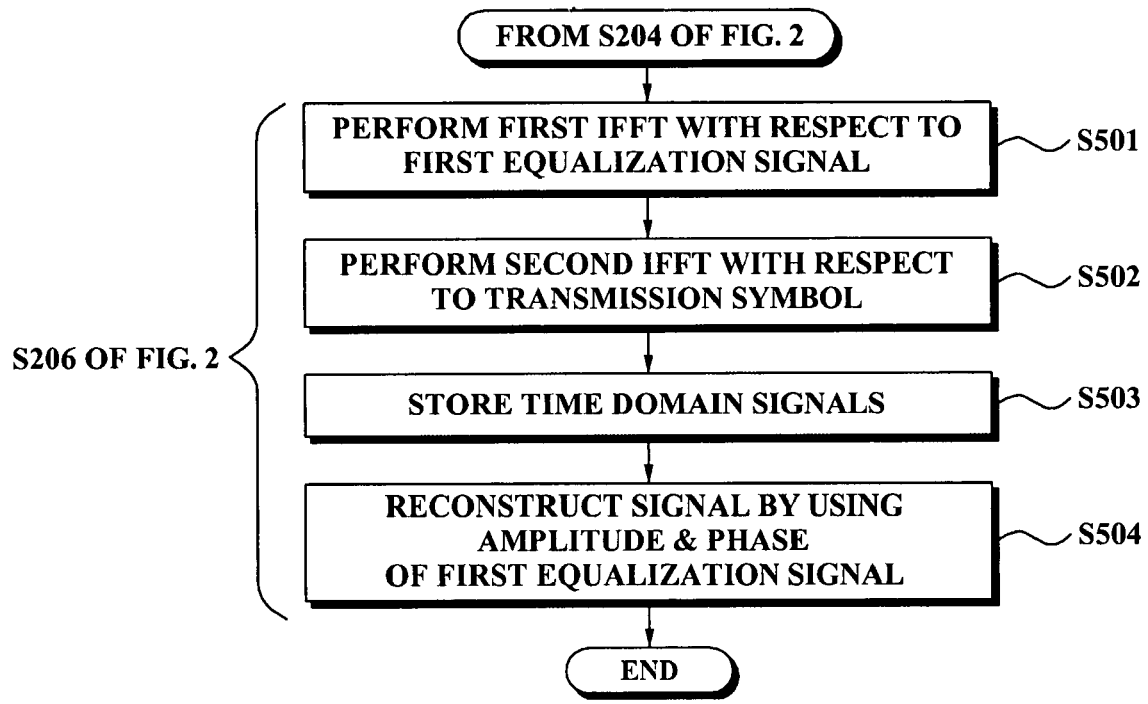
FIG. 5 is a flowchart illustrating a method of correcting clipping distortion of a receiver system which is performed in a signal reconstruction unit according to another exemplary embodiment of the present invention.

FIG. 5 is a flowchart illustrating a method of correcting clipping distortion of a receiver system which is performed in the signal reconstruction unit 120 according to another exemplary embodiment of the present invention. Specifically, FIG. 5 illustrates an example of operation S206 of reconstructing the signal when the level of the amplitude of the transmission symbol is less than or equal to the reference value.

In operation S501, a first IFFT is performed to transform a frequency domain signal into a time domain signal with respect to a first equalization signal.

In operation S502, a second IFFT is performed to transform the frequency domain signal into the time domain signal with respect to a transmission signal.

In operation S503, the time domain signals, which are transformed in the first IFFT and the second IFFT, are stored in the storage unit 122 of FIG. 2.

In operation S504, a signal is regenerated by using a phase and an amplitude of the time domain signal of the first equalization signal.

Figure 6:
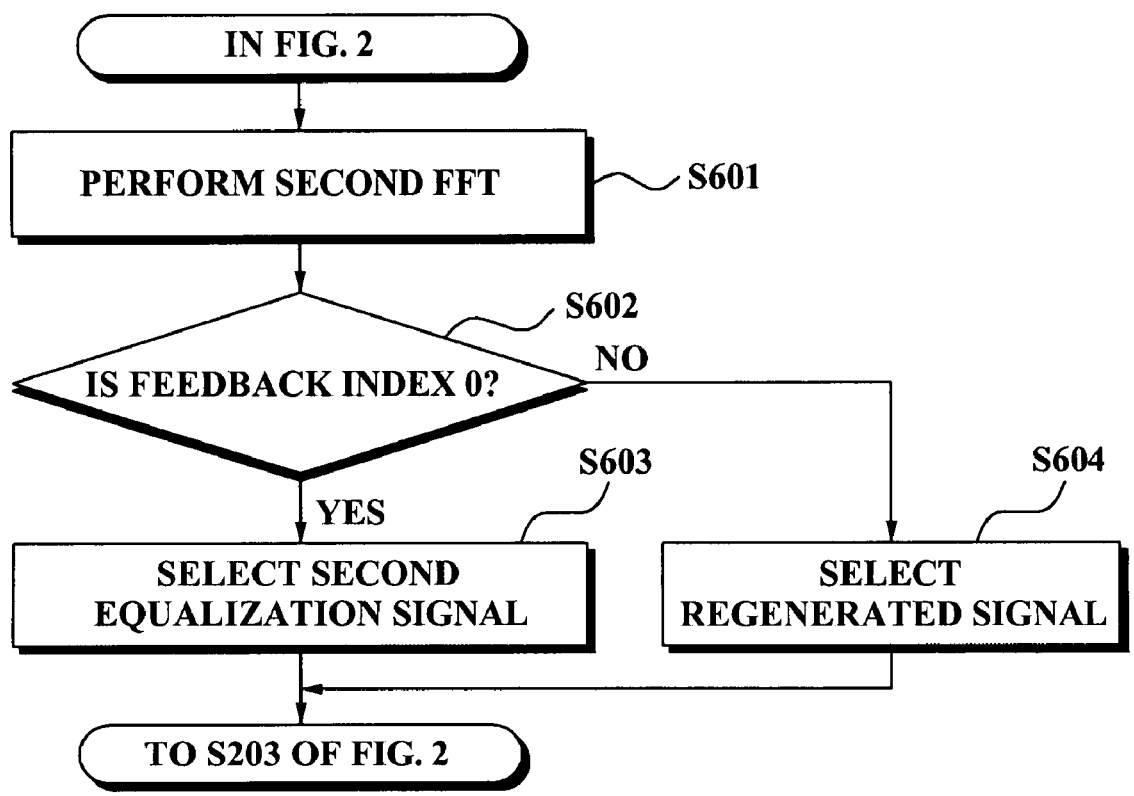
FIG. 6 is a flowchart illustrating a method of controlling a switching unit by feeding back a signal which is regenerated in a method of correcting clipping distortion of a receiver system according to an exemplary embodiment of the present invention.

FIG. 6 is a flowchart illustrating a method of controlling the switching unit 126 of FIG. 1 by feeding back a regenerated signal in a method of correcting clipping distortion of a receiver system according to an exemplary embodiment of the present invention.

In operation S601, a feedback signal is generated by performing a second FFT to transform the time domain signal into the frequency domain signal with respect to the regenerated signal in operation S404 of FIG. 4.

In operation S602, it is determined whether a feedback index corresponding to a number of feedback signals fedback to the switching unit 125 is 0. Depending upon a result of the determination, when the feedback index is 0, the second equalization signal is selected in operation S603. Also, when the feedback signal is greater than or equal to 1, the regenerated signal is selected in operation S604.

According to the present invention, there is provided a method and apparatus for correcting clipping distortion of a receiver system, which can estimate an initial estimation value of a signal with comparatively high reliability, restore the signal, and improve the BER of a system by performing equalization using two equalization coefficients to acquire an estimation value of a clipped signal and an estimation value of a pre-clipped signal, and also can reduce system complexity by reducing a number of signal restorations.

Also, according to the present invention, there is provided a method and apparatus for correcting clipping distortion of a receiver system, which can reduce decision error propagation that may occur when restoring a clipped signal.

Also, according to the present invention, there is provided a method and apparatus for correcting clipping distortion of a receiver system, which can utilize an optimal equalizer for each of a clipped signal and a non-clipped signal of a transmission signal, which is required during a decision-aided reconstruction (DAR) and an iterative amplitude restructure (IAR) signal restoration processes, and thereby can restore a signal by considering both an additive white Gaussian noise (AWGN) and clipping noise.

Although a few exemplary embodiments of the present invention have been shown and described, the present invention is not limited to the described exemplary embodiments. Instead, it will be appreciated by those skilled in the art that changes may be made to these exemplary embodiments without departing from the principles and spirit of the invention, the scope of which is defined by the claims and their equivalents.

What is claimed is:

1. An apparatus for correcting clipping distortion of a receiver system, the apparatus comprising:
    an equalizer which generates a first equalization signal by equalizing a frequency domain clipping signal via a first equalization coefficient correcting a channel distortion, and generates a second equalization signal by equalizing the frequency domain clipping signal via a second equalization coefficient correcting the clipping distortion and the channel distortion; and
    a signal reconstruction unit which receives the first equalization signal and the second equalization signal from the equalizer, determines a transmission symbol by performing a hard decision with respect to the second equalization, and reconstructs a signal using an amplitude of the transmission symbol and a phase of the first equalization signal when a level of the amplitude of the transmission symbol is greater than or equal to a reference value.

2. The apparatus of claim 1, wherein the reference value corresponds to clipping amplitude.

3. The apparatus of claim 1, wherein the signal reconstruction unit reconstructs the signal by using the phase and amplitude of the first equalization signal when the level of the amplitude of the transmission symbol is less than the reference value.

4. The apparatus of claim 1, further comprising:
    a first fast Fourier transform (FFT) calculator which generates the frequency domain clipping signal by transforming a time domain signal into a frequency domain signal with respect to a received signal of the receiver system, and outputs the generated frequency domain clipping signal to the equalizer.

5. The apparatus of claim 1, wherein the equalizer determines the first equalization coefficient according to a frequency response of a channel.

6. The apparatus of claim 1, wherein the equalizer determines the second equalization coefficient according to clipping ratio which is a ratio of an amplitude of a pre-clipped signal to an amplitude of the frequency domain clipping signal.

7. The apparatus of claim 1, wherein the signal reconstruction unit comprises:
    a first inverse fast Fourier transform (IFFT) calculator which transforms a frequency domain signal into a time domain signal with respect to the first equalization signal, and outputs the transformed time domain signal;
    a transmission symbol determination unit which determines the transmission symbol by performing the hard decision with respect to the second equalization signal;
    a second IFFT calculator which transforms the frequency domain signal into the time domain signal with respect to the transmission symbol;
    a storage unit which stores the time domain signals having been input from the first IFFT calculator and the second IFFT calculator; and
    a signal regeneration unit which regenerates a signal by using a phase of the time domain signal of the first equalization signal, and the amplitude of the time domain signal of the transmission symbol or the amplitude of the time domain signal of the first equalization signal.

8. The apparatus of claim 7, wherein the signal reconstruction unit further comprises:
    a second FFT calculator which generates a feedback signal by receiving the regenerated signal and transforming the time domain signal into the frequency domain signal with respect to the regenerated signal;
    a switching signal generation unit which generates a switching signal according to a number of feedback signals being generated; and
    a switching unit which selects any one of the second equalization signal and the feedback signal according to the switching signal, and outputs the selected signal to the transmission symbol determination unit,
    wherein the transmission symbol determination unit determines the transmission symbol by performing the hard decision with respect to the signal input from the switching unit.

9. The apparatus of claim 8, wherein the switching signal controls the switching unit to select the second equalization signal when the number of generated feedback signals is 0, and controls the switching unit to select the feedback signal when the number of generated feedback signals is greater than or equal to 1.

10. The apparatus of claim 1, wherein the receiver system supports a wideband wireless communication scheme which comprises an Orthogonal Frequency Division Multiplexing (OFDM) scheme and an Orthogonal Frequency Division Multiple Access (OFDMA) scheme.

11. A method of correcting clipping distortion, the method comprising:
    receiving a frequency domain clipping signal;
    generating, by a processor, a first equalization signal by equalizing the frequency domain clipping signal via a first equalization coefficient correcting a channel distortion, and generating a second equalization signal by equalizing the frequency domain clipping signal via a second equalization coefficient correcting the clipping distortion and the channel distortion;
    determining, by a processor, a transmission symbol by performing a hard decision with respect to the second equalization signal;
    comparing a level of an amplitude of the transmission symbol with a reference value; and
    reconstructing a signal by using the amplitude of the transmission symbol and a phase of the first equalization signal when the level of the amplitude of the transmission symbol is greater than or equal to a reference value.

12. The method of claim 11, wherein the reference value corresponds to a clipping amplitude.

13. The method of claim 11, wherein the reconstructing step comprises:
    reconstructing the signal by using the amplitude of the transmission symbol and the phase of the first equalization signal when the level of the amplitude of the transmission symbol is greater than or equal to the reference value, and regenerating the signal by using the phase and amplitude of the first equalization signal when the level of the amplitude of the transmission symbol is less than the reference value.

14. The method of claim 11, further comprising:
performing a first FFT which generates the frequency domain clipping signal by transforming a time domain signal into a frequency domain signal with respect to a received signal of the receiver system.

15. The method of claim 11, wherein the first equalization coefficient is determined according to a frequency response of a channel.

16. The method of claim 12, wherein the second equalization coefficient is determined according to a clipping ratio which is a ratio of an amplitude of a pre-clipped signal to an amplitude of the frequency domain clipping signal.

17. The method of claim 11, wherein the reconstructing step comprises:
performing a first IFFT which transforms a frequency domain signal into a time domain signal with respect to the first equalization signal;
determining the transmission symbol by performing the hard decision with respect to the second equalization signal;
performing a second IFFT which transforms the frequency domain signal into the time domain signal with respect to the transmission symbol;
storing the time domain signals which are transformed in the first IFFT and the second IFFT; and
regenerating a signal by using a phase of the time domain signal of the first equalization signal, and the amplitude of the time domain signal of the transmission symbol or the amplitude of the time domain signal of the first equalization signal.

18. The method of claim 17, wherein the reconstructing step further comprises:
performing a second FFT which generates a feedback signal by transforming the time domain signal into the frequency domain signal with respect to the regenerated signal,
wherein, in the determining step, the transmission symbol is determined by performing the hard decision with respect to the feedback signal.

19. A computer-readable recording medium storing executable instructions implementing a method of correcting clipping distortion, the method comprising:
receiving a frequency domain clipping signal;
generating a first equalization signal by equalizing the frequency domain clipping signal via a first equalization coefficient correcting a channel distortion, and generating a second equalization signal by equalizing the frequency domain clipping signal via a second equalization coefficient correcting the clipping distortion and the channel distortion;
determining a transmission symbol by performing a hard decision with respect to the second equalization signal;
comparing a level of an amplitude of the transmission symbol with a reference value; and
reconstructing a signal by using the amplitude of the transmission symbol and a phase of the first equalization signal when the level of the amplitude of the transmission symbol is greater than or equal to a reference value.

* * * * *